United States Patent [19]
Earle

[11] Patent Number: 5,359,724
[45] Date of Patent: Oct. 25, 1994

[54] METHOD AND APPARATUS FOR STORING AND RETRIEVING MULTI-DIMENSIONAL DATA IN COMPUTER MEMORY

[75] Inventor: Robert J. Earle, Sunnyvale, Calif.

[73] Assignee: Arbor Software Corporation, Santa Clara, Calif.

[21] Appl. No.: 860,443

[22] Filed: Mar. 30, 1992

[51] Int. Cl.$^5$ .................. G06F 12/02; G06F 15/40
[52] U.S. Cl. ........................ 395/425; 395/600; 364/DIG. 1; 364/251; 364/251.6; 364/282.1; 364/283.1
[58] Field of Search .............. 364/724.05, 728.05; 395/600, 400, 425, 166

[56] References Cited

U.S. PATENT DOCUMENTS

| | | | |
|---|---|---|---|
| 3,624,616 | 11/1971 | Patel | 395/400 |
| 4,051,551 | 9/1977 | Lawrie et al. | 395/425 |
| 4,313,159 | 1/1982 | Shoap | 395/425 |
| 4,570,236 | 2/1986 | Rebel et al. | 395/400 |
| 4,809,156 | 2/1989 | Taber | 395/400 |
| 5,055,998 | 10/1991 | Wright et al. | 395/800 |
| 5,130,924 | 7/1992 | Barker et al. | 364/419.1 |
| 5,247,632 | 9/1993 | Newman | 395/400 |
| 5,257,365 | 10/1993 | Powers et al. | 395/600 |
| 5,280,547 | 1/1994 | Mahoney | 382/49 |

OTHER PUBLICATIONS

Knuth, Donald E., "The Art of Computer Programming—vol. 1/Fundamental Algorithms," Addison-Wesley Publishing Company, Inc., 1969, pp. 295–302.

*Primary Examiner*—Paul V. Kulik
*Attorney, Agent, or Firm*—Kenneth M. Kaslow; Robert Barr; Joseph A. Sawyer, Jr.

[57] ABSTRACT

A method and apparatus for storing and retrieving multi-dimensional data in which a multi-level data structure is defined wherein one level contains those dimensions chosen by the user to result in dense data and the other level contains the remaining sparse data combinations. The dense dimensions specified in any given case are used to determine the basic block size used to store information. The remaining sparse dimensions are used to create the upper level structure which is used to point to the block which contains the desired information. Depending upon the sparseness of the data, different types of upper level structure may be used. Both the variable data block size and the choice of pointer structure may be used to balance the memory required against the speed of retrieval. Once the data structure is created, the data in the data blocks, and the pointers in one type of upper level pointer structure, may be retrieved by simple calculation of the offset of the desired cell in memory rather than requiring a search.

19 Claims, 13 Drawing Sheets

|  | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| 1 | Jan | Feb | Mar | Apr | May | Jun | Jul | Aug | Sep | Oct | Nov | Dec | Q1 | Q2 | Q3 | Q4 | Year |
| 5 |  |  |  |  |  |  |  |  |  |  |  |  |  |  |  |  |  |
| 6 |  |  |  |  |  |  |  |  |  |  |  |  |  |  |  |  |  |
| 7 Sales | 1,098 | 1,007 | 1,189 | 1,002 | 990 | 1,034 | 997 | 1,003 | 1,132 | 1,098 | 1,134 | 1,339 | 3294 | 3026 | 3132 | 3571 | 13,023 |
| 8 Cost of Goods Sold | 412 | 389 | 461 | 388 | 387 | 388 | 376 | 368 | 432 | 413 | 423 | 502 | 1262 | 1163 | 1176 | 1338 | 4,939 |
| 9 Margin | 686 | 618 | 728 | 614 | 603 | 646 | 621 | 635 | 700 | 685 | 711 | 837 | 2,032 | 1,863 | 1,956 | 2,233 | 8,084 |
| 10 |  |  |  |  |  |  |  |  |  |  |  |  |  |  |  |  |  |
| 11 Marketing | 87 | 98 | 87 | 57 | 98 | 78 | 98 | 87 | 98 | 87 | 96 | 131 | 272 | 243 | 283 | 318 | 1,114 |
| 12 Payroll | 230 | 230 | 230 | 230 | 230 | 230 | 230 | 230 | 230 | 230 | 230 | 230 | 690 | 690 | 680 | 690 | 2,760 |
| 13 Misc | 2 | 6 | 7 | 8 | 9 | 9 | -21 | 6 | 8 | 9 | 23 | -34 | 18 | 26 | -7 | -4 | 32 |
| 14 Total Expenses | 319 | 334 | 324 | 295 | 337 | 317 | 307 | 323 | 336 | 326 | 349 | 327 | 977 | 959 | 956 | 1,004 | 3,906 |
| 15 |  |  |  |  |  |  |  |  |  |  |  |  |  |  |  |  |  |
| 16 Profit | 367 | 200 | 404 | 308 | 274 | 319 | 314 | 315 | 364 | 353 | 360 | 510 | 1,051 | 301 | 993 | 1,223 | 4,168 |
| 17 |  |  |  |  |  |  |  |  |  |  |  |  |  |  |  |  |  |
| 18 Margin % | 62.48 | 61.22 | 61.19 | 61.18 | 51.22 | 61.51 | 62.29 | 60.61 | 61.84 | 61.64 | 52.70 | 52.51 | 51.83 | 61.31 | 52.58 | 62.38 | 61.98 |
| 19 Profit % | 33.42 | 27.92 | 33.94 | 30.74 | 27.45 | 30.85 | 31.42 | 31.41 | 32.18 | 32.15 | 31.75 | 38.09 | 31.93 | 29.70 | 31.70 | 34.25 | 31.98 |

Fig. 1

|        | Jan | Feb | Mar | Apr | May | Jun | Jul | Aug | Sep | Oct | Nov | Dec | Q1 | Q2 | Q3 | Q4 | Year |
|--------|-----|-----|-----|-----|-----|-----|-----|-----|-----|-----|-----|-----|----|----|----|----|------|
| Sales  |     |     |     |     |     |     |     |     |     |     |     |     |    |    |    |    |      |
| Camera |     |     |     |     |     |     |     |     |     |     |     |     |    |    |    |    |      |
| TV     |     |     |     |     |     |     |     |     |     |     |     |     |    |    |    |    |      |
| VCR    |     |     |     |     |     |     |     |     |     |     |     |     |    |    |    |    |      |
| Audio  |     |     |     |     |     |     |     |     |     |     |     |     |    |    |    |    |      |
| COGS   |     |     |     |     |     |     |     |     |     |     |     |     |    |    |    |    |      |
| Camera |     |     |     |     |     |     |     |     |     |     |     |     |    |    |    |    |      |
| TV     |     |     |     |     |     |     |     |     |     |     |     |     |    |    |    |    |      |
| VCR    |     |     |     |     |     |     |     |     |     |     |     |     |    |    |    |    |      |
| Audio  |     |     |     |     |     |     |     |     |     |     |     |     |    |    |    |    |      |
| Margin |     |     |     |     |     |     |     |     |     |     |     |     |    |    |    |    |      |
| Camera |     |     |     |     |     |     |     |     |     |     |     |     |    |    |    |    |      |
| TV     |     |     |     |     |     |     |     |     |     |     |     |     |    |    |    |    |      |
| VCR    |     |     |     |     |     |     |     |     |     |     |     |     |    |    |    |    |      |
| Audio  |     |     |     |     |     |     |     |     |     |     |     |     |    |    |    |    |      |
| etc.   |     |     |     |     |     |     |     |     |     |     |     |     |    |    |    |    |      |

Fig. 2

| January | Camera | TV | VCR | Audio | Total |
|---|---|---|---|---|---|
| Sales | | | | | |
| COGS | | | | | |
| Margin | | | | | |
| Marketing | | | | | |
| Payroll | | | | | |
| Misc Exp | | | | | |
| Total Exp | | | | | |
| Profit | | | | | |
| Margin % | | | | | |
| Profit % | | | | | |

Fig. 3a

| Sales | Jan | Feb | Mar | Apr | May | Jun | Jul | Aug | Sep | Oct | Nov | Dec | Q1 | Q2 | Q3 | Q4 | Year |
|---|---|---|---|---|---|---|---|---|---|---|---|---|---|---|---|---|---|
| Camera | | | | | | | | | | | | | | | | | |
| TV | | | | | | | | | | | | | | | | | |
| VCR | | | | | | | | | | | | | | | | | |
| Audio | | | | | | | | | | | | | | | | | |
| Total | | | | | | | | | | | | | | | | | |

Financial_Accounts
    Income_Statement
        Sales_Revenue
        Fixed_Expense
            Rents
            Leases
        Variable_Expense
            COGS
            Sales_Expense
Time
    FY89
        Qtr1_89
        Qtr2_89
        .
        .

FY90
        Qtr1_90
        .

Geographical
    Western_Hemisphere
        US
        S_America
            Venezuela
            Brazil
    Europe
        France
            Paris
            Marseilles
        Italy
    Asia
        Taiwan
        Singapore
        Hong_Kong
Total_Product_Line
    Electronics
        Radios
        TV
    Foods
        Beverages
        Canned_Goods
        Cereals
Dsitribution_Channels
    Wholesale
        Mail_Order_Houses
        Chains
        Distributors
    Retail
        Wholly_Owned_Electronics_Outlets
        Catalog_Sales

Fig. 6

|   | 1 | 2 | 3 | 4 | 5 | 6 | 7 |
|---|---|---|---|---|---|---|---|
| 1 | Alias | | | | | Sample Outline | |
| 2 | Period | Year | | | | | |
| 3 | | | Qtr1 | | | | |
| 4 | | | | Jan, | Feb, | Mar | |
| 5 | | | Qtr2 | | | | |
| 6 | | | | Apr, | May, | Jun | |
| 7 | | | Qtr3 | | | | |
| 8 | | | | Jul, | Aug, | Sep | |
| 9 | | | Qtr4 | | | | |
| 10 | | | | Oct, | Nov, | Dec | |
| 11 | | | | | | | |
| 12 | | Market | | | | | |
| 13 | | | East | | | | |
| 14 | | | | New_York, Boston, Chicago | | | |
| 15 | | | West | | | | |
| 16 | | | | San_Francisco, Denver, Seattle, Los_Angeles | | | |
| 17 | | | South | | | | |
| 18 | | | | Dallas, Phoenix, Houston | | | |
| 19 | | | | | | | |
| 20 | | Product | | | | | |
| 21 | | | Audio | | | | |
| 22 | | | | Stereo, Compact_Disc | | | |
| 23 | | | Visual | | | | |
| 24 | | | | Television, VCR, Camera | | | |
| 25 | | | | | | | |
| 26 | | Accounts | | | | | |
| 27 | Net_Profit | | Profit | | | | |
| 28 | | | | Margin | | | |
| 29 | | | | | Sales | | |
| 30 | COGS | | | | Cost_of_Goods_Sold | | |
| 31 | | | | Total_Expenses | | | |
| 32 | | | ~ | Profit_% = Profit % Sales | | | |
| 33 | | | ~ | Margin_% = Margin % Sales | | | |
| 34 | | | | | | | |
| 35 | | Scenario | | | | | |
| 36 | | | Budget | | | | |
| 37 | | | ~ | Actual | | | |
| 38 | | | ~ | Variance = Actual - Budget | | | |
| 39 | | | | | | | |

Fig. 12

METHOD AND APPARATUS FOR STORING AND RETRIEVING MULTI-DIMENSIONAL DATA IN COMPUTER MEMORY

BACKGROUND OF THE INVENTION

1. Field of the Invention

The present invention relates generally to computer memory and more specifically to a method and apparatus for storing and retrieving multi-dimensional data, such as financial data, in computer memory such that the speed of accessing the memory is maximized and the amount of memory needed to store such data is minimized.

2. Description of the Relevant Art

Financial data is often viewed in the form of a spreadsheet containing rows and columns of figures, or data. It has become common to implement such spreadsheets on computers, so that changes to one item may be automatically reflected in any other items which use the altered item as a basis for a calculation. Before any such manipulation of data can occur, however, the data must be imported from storage or input by the user. Many companies and individuals now routinely enter their basic financial data into computers for such later retrieval and manipulation.

A spreadsheet may be thought of as a "two dimensional" array of data. For example, Company X might list income and expense accounts along the vertical axis and the months of the year along the horizontal axis, as shown in FIG. 1. Each block in the spreadsheet corresponds to a particular account and a particular month, and the amount of that account in that month, if any, is entered in that block. In this example, the list of accounts is one "dimension" and time is the other dimension. In this example, some accounts depend on other accounts; for example, "Margin" is "Sales" less "Cost of Goods Sold." One advantage of computerized spreadsheets is that once the user defines this relationship, if any of the basic data is changed, such as the entry for Sales or the entry for Cost of Goods Sold, the computer can recalculate the data which depends on the changed data, such as Margin. This saves the user the effort of changing all entries which depend on other entries.

In this example, the number of potential "cells" or items of data is equal to the number of accounts times the number of time periods included on the spreadsheet. (Here there are 17 time periods, not 12, because the user wishes to summarize the accounts by quarter and year as well as month; there could be many more time periods if more than one year is to be included.) Each item of data may be considered to have two "attributes" or identifying characteristics, one indicating the account to which the indicated amounts are attributed and the second indicating the time period in which the indicated receipts or expenditures took place.

Another factor which becomes important in these applications is the ability to "consolidate" data. For example, in FIG. 1, the summaries by quarter and year mentioned above are consolidated data from the three months of each quarter or the entire year, respectively. As with the Margin example above, the data for the quarters or the year need not be independently entered, but may be calculated from the monthly data and the spreadsheet instructed to recalculate these figures after any changes to the basic monthly data.

However, many corporations have data which has more than two dimensions. For example, Company X may have several product lines, and may wish to be able to view data showing the accounts by each product line over time, rather than, or as well as, by total accounts for the company, i.e. the total of all product lines. Thus, the product lines of Company X make up a third dimension. In turn, the value of each total account for a given time period represents the sum of that account for each of the product lines and thus is the result of consolidating the data from the different product lines.

Now the potential number of data cells is greater, and equal to the number of accounts times the number of months times the number of product lines. Each item of data now has three attributes, one indicating the account, another indicating the month, and the third indicating the product line represented by the data. This may still be somewhat manageable in terms of the storage needed.

Also, once the number of dimensions exceeds two, it is useful to be able to view the relationship between any two dimensions. That is, in this example, the user may wish to view accounts over time for any or all product lines, accounts by product line for any or all time periods, or product lines over time for any or all accounts. This data can be exhibited by a series of spreadsheets, each showing one such relationship. Thus, the spreadsheet shown in FIG. 1 shows accounts over time; however, it only shows the total accounts. While each account could be broken down by product line, as shown in FIG. 2, this greatly increases the size of the spreadsheet and makes it more difficult to find all of the entries related to, for example, the Camera product line, since one dimension, either accounts or product line, ends up being scattered across the other dimension.

Similarly, FIG. 3a shows accounts by product line. However, this is for only one time period, here January. If the user wishes to break the accounts down by time as well, again the spreadsheet becomes much larger and the entries for one dimension or the other are no longer contiguous in the spreadsheet. Again in FIG. 3b, which shows the product lines over time, only one account is shown, here Sales. To include other accounts again increases the size and complexity of the spreadsheet.

If Company X also has geographic areas, this constitutes a fourth dimension. Each item of data now has four attributes, and the total number of potential cells is the three dimensional total times the number of geographic areas. And if the company wishes to have different "scenarios," for example, to make budget forecasts and then compare the actual results to those forecasts, this is a fifth dimension, and five attributes are needed, with the number of potential cells is now multiplied again, this time by the number of possible scenarios.

In each of these cases, the number of cells required of a spreadsheet to show all possible relationships between dimensions also increases dramatically. FIGS. 4a to 4d show some possible views of such a five dimensional database which a user might wish to see. For example, the front "face" of FIG. 4a is a spreadsheet showing the actual figures for sales and profits for various products as compared to the budgeted figures over time for the San Francisco market. Behind that spreadsheet are other spreadsheets showing the same information for other cities, followed by a spreadsheet showing the same information for the "West," i.e. the total for those cities. FIGS. 4b to 4d each show a similar "stack" of spreadsheets which represents a three dimensional view of the five dimensional database. Note that in each of these examples, there is some intermingling of more than two dimensions, as shown in FIG. 2. Many more possible views could be constructed from the five dimensions used here.

It is thus obvious that the number of possible data cells rapidly becomes enormous if all combinations of data are to be precalculated and ready for reporting (as is necessary to avoid long waits for consolidation and special calculation for even the simplest reports). For example, suppose that there are seven dimensions in a particular application, and that the number of items in each dimension is 10. Each data cell must have seven attributes, each attribute being one of the 10 members of each dimension, and the total number of potential data cells is thus $$10 \times 10 \times 10 \times 10 \times 10 \times 10 \times 10$$

or 10,000,000. Since a data cell containing a standard double precision floating point number requires 8 bytes, 80,000,000 bytes are required to reserve a place for all of the potential cells. Common practice in microcomputer spreadsheet implementation is to maintain all cells in memory, if possible, to speed access time. But since most microprocessors have less than 16 megabytes of memory, most or all of the data would have to be kept on disk if a space were reserved for each potential cell. This would slow the speed of storage and access drastically, but could be done since an 80 megabyte drive is a common fixture on personal computers today.

But suppose that instead of 10 items in each dimension, there are, respectively, 30, 50, 400, 300, 80, 10 and 50. Now the total number of potential cells is $$30 \times 50 \times 400 \times 300 \times 80 \times 10 \times 50$$

or 7,200,000,000,000. Again, with 8 bytes per data cell, a total of 57,600,000,000,000 bytes are required to store all of the potential cells. No currently available disk drive can hold this much data. Even with gigabyte size disk drives, over 50,000 such drives would be needed. If the dimensions have more items, or if there are more than 7 dimensions, the problem may be even worse.

Most databases which handle problems of this magnitude keep only data which actually exists, i.e. they are relational databases whose tables consist only of records that need to exist, and thus do not waste space on "potential" data records. But relational database tables are basically two-dimensional structures (a series of records each containing a fixed "field" dimension) and cannot handle higher dimensionality in any straightforward fashion. Worse, any time a specific data cell is needed, some sort of search of the records must be done whether or not an index is available. In fact, even an index must be searched for the matching attributes. Because the table records have "gaps", even if the records are organized in some regular repeating order, an offset from the beginning of the table cannot be calculated directly to find the desired record. Thus, by conserving space by keeping only the actual data, whether on disk or in memory, speed of access is drastically reduced. This is true of any data structure which has discontinuities in the attributes of adjacent blocks or records of data rather than reserving a place, with a specific length, in a specific known order for any potential data item.

Existing multidimensional databases (non-relational and non-spreadsheet) which incorporate the ability to directly calculate the offset to the desired data item do so by one of two methods. One approach is to use a one-level structure, i.e. to have one data block containing all dimension combinations. The obvious drawback to this is that most of the reserved space is wasted and the number of dimensions and the numbers of members in each dimension is severely limited. If the application is even of medium size, operating in memory must be abandoned to use a disk, and even disk, as slow as it is, cannot offer the space required by typical corporate applications.

The other, more common approach uses a multi-level structure, usually having two levels. The upper level is some sort of index to existing data blocks, and the lower level is either a 1 or 2 dimensional block of data, such as a record representing a single dimension such as a time series, or a spreadsheet-like two-dimensional data block, respectively. The upper level must be searched to find the right index for a given set of attributes. In theory, the upper level may be a list of all potential combinations in a specific order so that the offset to the particular index (pointer) may be calculated from the attributes in the dimensions covered by the upper level structure, but no products using such an upper level are known. Since the potential number of combinations of the upper level attributes is often very large, it is believed that the existing products in this group resort to a sorted list which does not contain unused combinations, and therefore a search of some kind must be employed to reach the proper pointer.

Besides the loss of speed due to this search requirement, the biggest drawback to this type of design is that the number of dimensions in the "block" of data pointed to is fixed at either 1 or 2 dimensions, depending on the database. Furthermore, the specific type of dimension which forms the basic block of data is usually fixed. For example, one product with a one-dimensional data block requires that this dimension be the Time dimension. Another product which has a two-dimensional block requires that the two d linens ions represent "rows" and "columns" (normally Accounts and Time, respectively). But the operations which can be performed on "rows", "columns" and the other dimensions are distinctly different and therefore limiting as to which type of attribute can be effectively and flexibly used as "rows" or "columns." For example, the "rows" dimension has available a set of calculation functions which are most appropriate for Accounts, so if Accounts are not set up as the row dimension, there is a severe limitation in performing analytical calculations typically required for Account relationships in financial applications. In the time-series oriented structure, the block dimension must be time.

However, the restriction that is most unfortunate is that the user cannot select the number of dimensions which make up the basic unit of data storage and usually cannot even select the dimensions which comprise it. This is not optimal for a number of reasons.

In multidimensional databases, as previously discussed, the major problem is sparseness of data. More often than not, the data for most potential combinations of dimensional attributes does not and will not exist. But to have the ability to directly calculate the location of a required data item, all potential combinations must be represented in the structure without discontinuities, or else the irregularity prevents the direct calculation of the offset to the desired cell.

A two level structure generally reduces this problem somewhat. If the basic unit of allocated storage (the block), when created, is always allocated to have a space for every combination of a subgroup of the dimensions, then within those blocks, at least, the offset can be directly calculated. If the upper level does not reserve a spot for every combination of the remaining dimensions, its size can be kept reasonable, although a slower search algorithm is necessary to locate a pointer in the upper level structure which gives the exact address of the block. Thus, in this structure, at least half of the procedure of locating a data item's location can be done by direct calculation, and blocks for which no data items exists need not be created.

The failure of the existing designs which use this approach to allow the user to select how many and which dimensions make up the block leads to some problems. First, the dimension or dimensions which make up the block may be very sparse for a given user's application. For example, if the user is forced to live with Accounts and Time as the block dimensions, and (as is often the case) there are hundreds or thousands of accounts, of which only a small percentage have data for a given combination of the other dimensions, each block that is allocated is still mostly wasted space.

For example, a company may have 500 departments, 80 product lines, 1000 accounts, 12 scenarios (e.g., Budget, Actual, Variance, Forecast1, Forecast2, etc.), and in each particular department/product line/scenario combination, only 20 of the accounts may have values, on average. Yet, which 20 accounts each department uses may be any 20 of the 1000 accounts. Therefore, each block that is created is, on average, comprised of 98% missing values. As a result, many such applications are impractical with existing multidimensional databases given the hardware constraints.

On the other hand, a database using a one-dimensional block which is fixed as the Time dimension will often make fairly good use of the allocated space, because if there is a data value for a particular combination of attributes in June, there is usually an observation in August and the remaining months. However, that leaves all the dimensions except Time to be represented in the upper level structure/index, and in a 7 dimensional application, this is impractical because either (1) the design reserves a fixed spot in the upper level structure for the pointer to the block, which means that if 6 dimensions are forced to go into the upper level structure, it is impossibly large; or (2) the size of the upper level structure is reduced by not reserving space for each possible combination. Unfortunately, as above, if this is done, a search algorithm must be used, and with small, one dimensional Time blocks, even the number of actually existing blocks is quite large, and the search is therefore very slow. Finally, it is assumed that the usage of a Time-dimension block is fairly dense (most cells used), but that might not be the case in some applications.

There are other variations on these two approaches, but all make use of a "fixed" block dimensional composition, and most must use a search algorithm to locate the index or pointer to the block containing the desired data cell. However, experience shows to the contrary, that there is no one fixed block design that effectively addresses even most applications. Each application has a different number of dimensions and of members in each dimension, and most importantly, a different distribution of data density/sparseness in relation to any specific subset of dimensions in that application.

SUMMARY OF THE INVENTION

In accordance with the illustrated preferred embodiment, the present invention provides a method and apparatus for storing and retrieving multi-dimensional data in which a two-level data structure is defined wherein one level contains those dimensions chosen by the user to result in dense data and the other level contains the remaining sparse data combinations.

For any given multidimensional application, it is likely that the user, who is intimately familiar with his company's structure and the nature of the application's data, can select the specific dimensions which will form the basic allocated data block, allowing a vastly wider array of applications to be efficiently handled by the database and to make optimal use of storage. A database design which gives the user this freedom offers a significant benefit and results in unparalleled speed of access/calculation, and minimum memory/disk requirement for each individual application, thus significantly expanding the practical range of multidimensional applications which can be run on existing hardware and software platforms.

The present invention allows the user to select the specific dimensions, and any number of them organized in any order, which will form the basic block of information. Because of the huge potential data requirements of multi-dimensional applications, this "variable block structure" is the only way many such applications can be practical. The variable block structure allows the user to select those dimensions which, taken together, result in a densely populated block, while balancing storage conservation with other considerations such as block size (and its effect on paging) and the size of the resulting upper level structure (which determines the optimal upper level structure type to select).

The remaining "sparse" dimensions, in which many or most member combinations will not exist, are used to create the upper level structure which is used to point to the block which contains the desired information. Depending upon the sparseness of the data, different types of upper level structure may be used to minimize the memory required. Allowing the user to select the type of upper level structure to "plug in" gives the user more control in balancing the tradeoff between speed (direct calculation of the upper level pointer versus searching) and the memory required for the upper level structure.

Allowing the user to select the dimensions which result in dense data, and thus in less empty or wasted cells, helps minimize the overall size of storage needed and the number and size of blocks which will be used in calculation, reporting, paging (if required) and backup. All of the dimensions, dense or sparse, are treated equally from the view of the user.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 shows a prior art two-dimensional spreadsheet.

FIG. 2 shows the spreadsheet of FIG. 1 with one of the two dimensions spread across a third dimension.

FIGS. 3a and 3b show two-dimensional spreadsheets representing relationships between dimensions of a three-dimensional database.

Figures 4A, 4B:
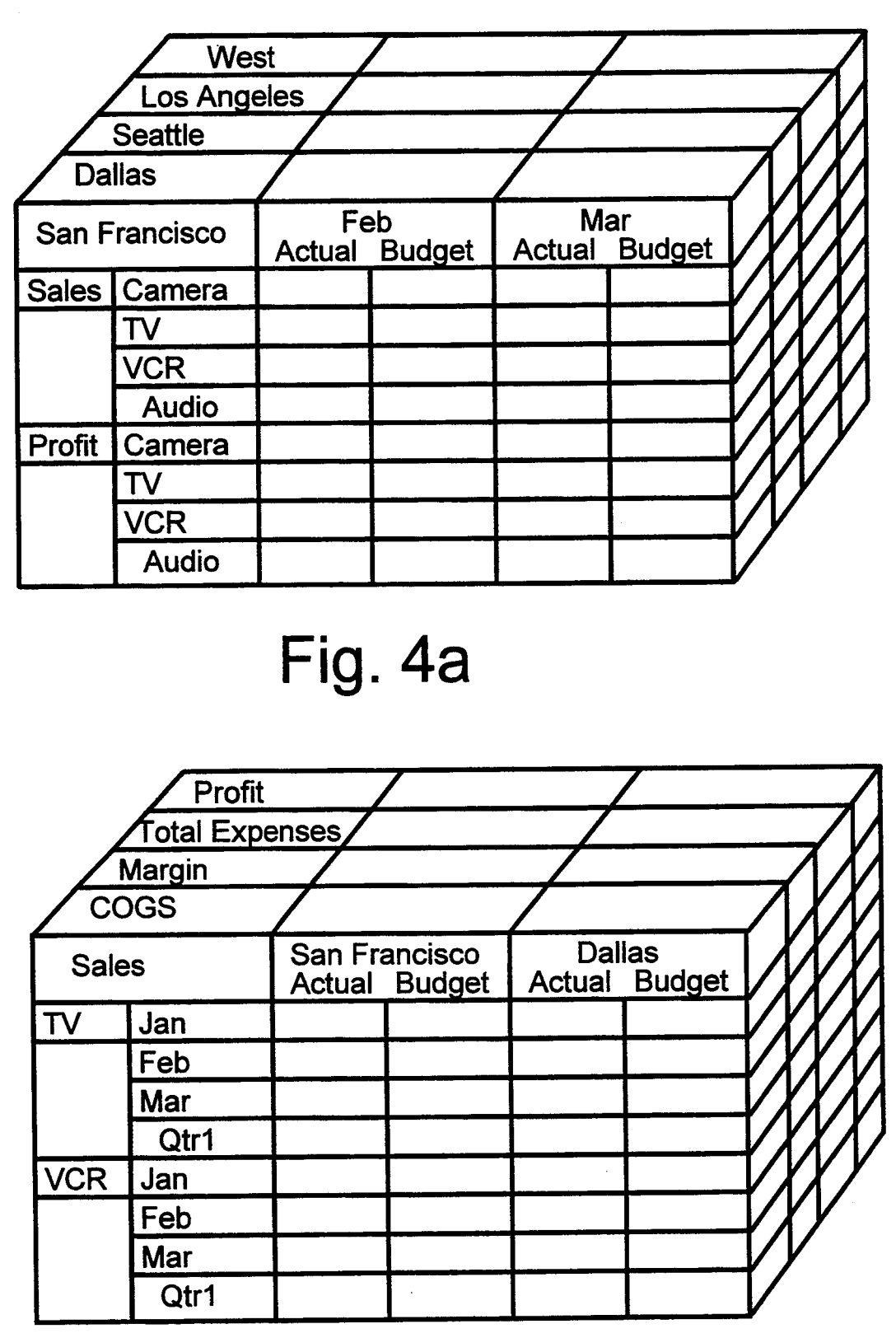
Figures 4C, 4D:
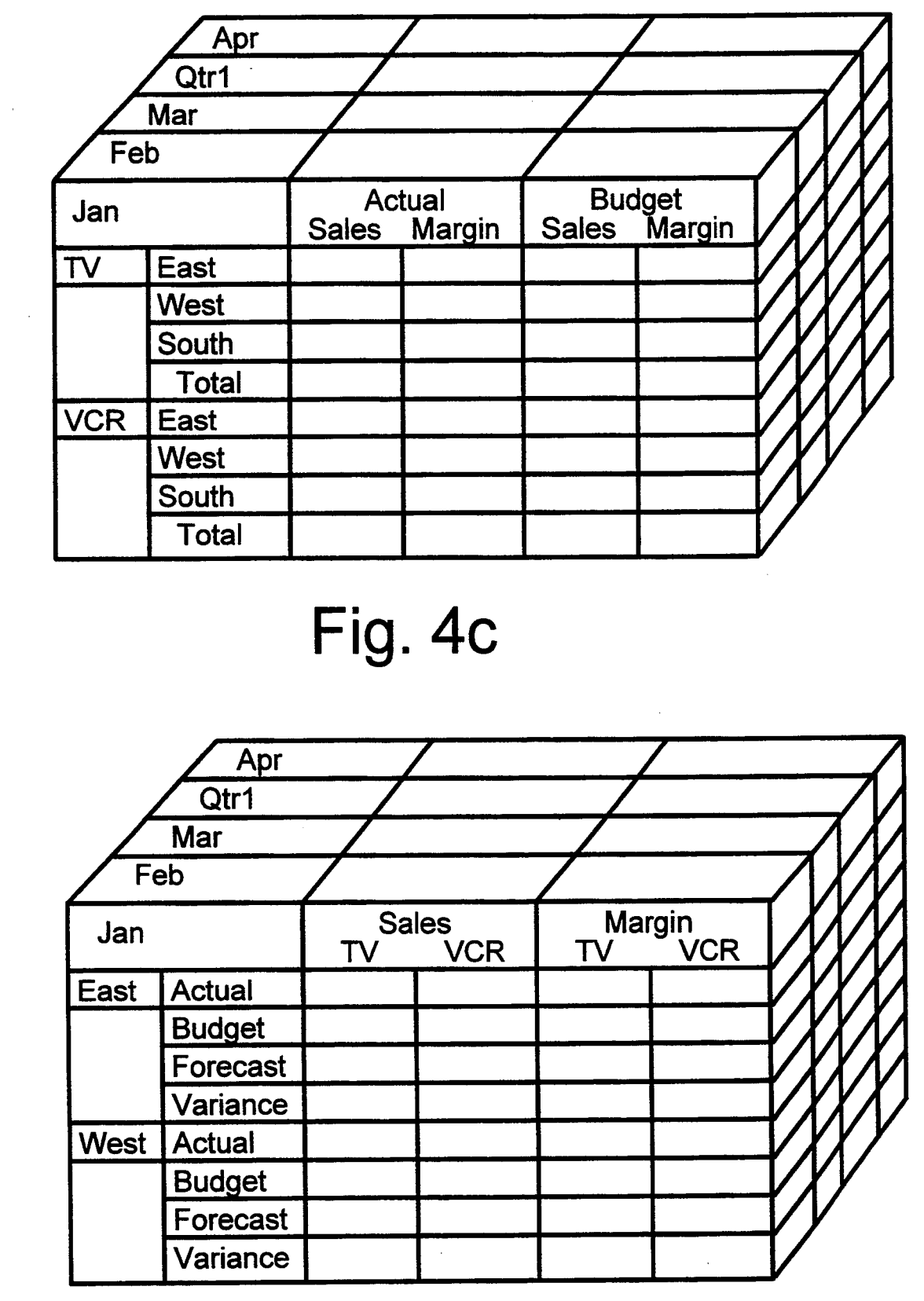

FIGS. 4a, 4b, 4c and 4d show stacks of spreadsheets representing three-dimensional views of a five-dimensional database.

FIG. 6 shows a representative member structure for a database in outline form.

FIG. 12 shows a member structure created in Excel ®.

DETAILED DESCRIPTION OF THE PREFERRED EMBODIMENT

FIGS. 5 through 12 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 5:
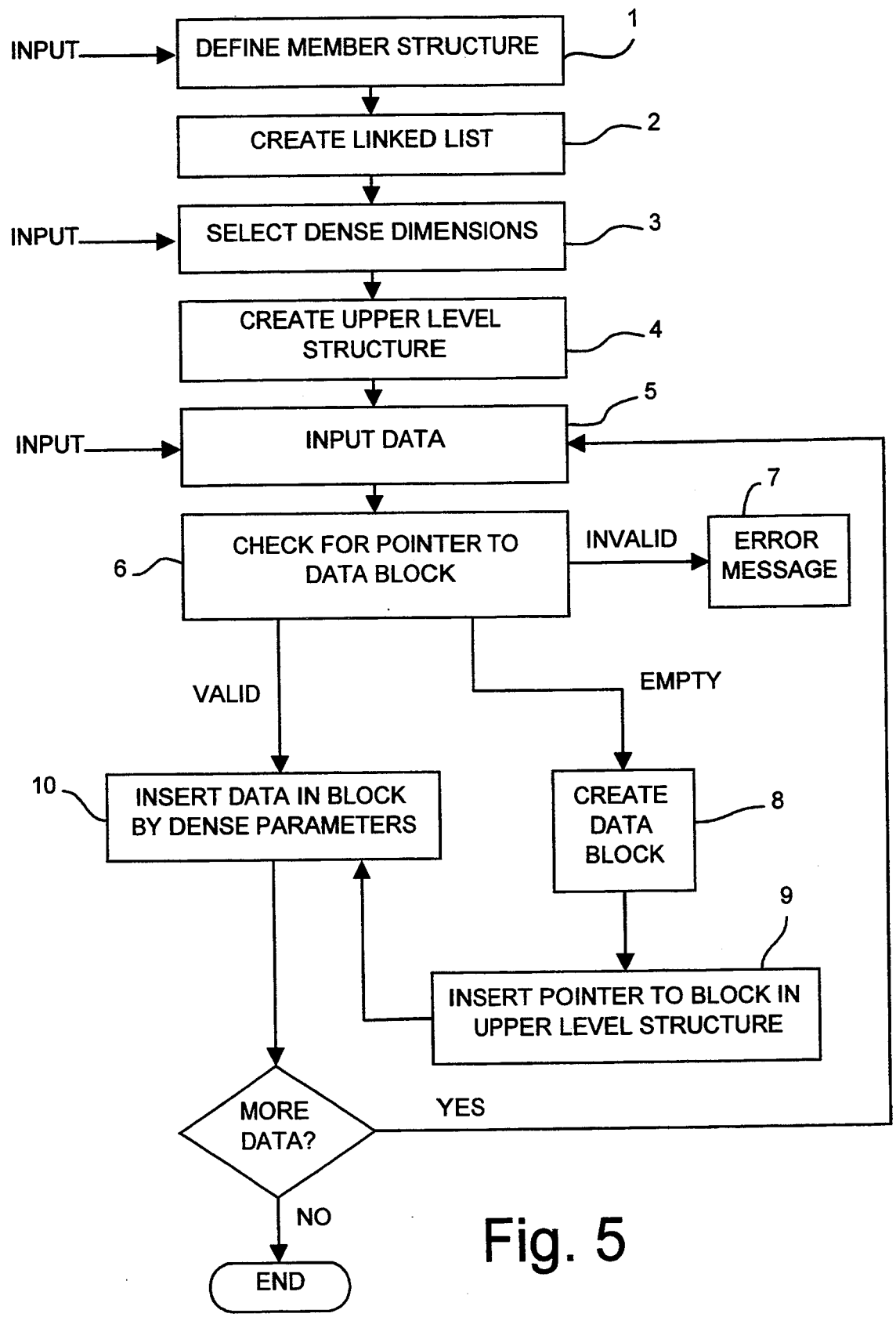
FIG. 5 is a flow chart of the method of allocating memory and storing data of the present invention.
Figure 7:
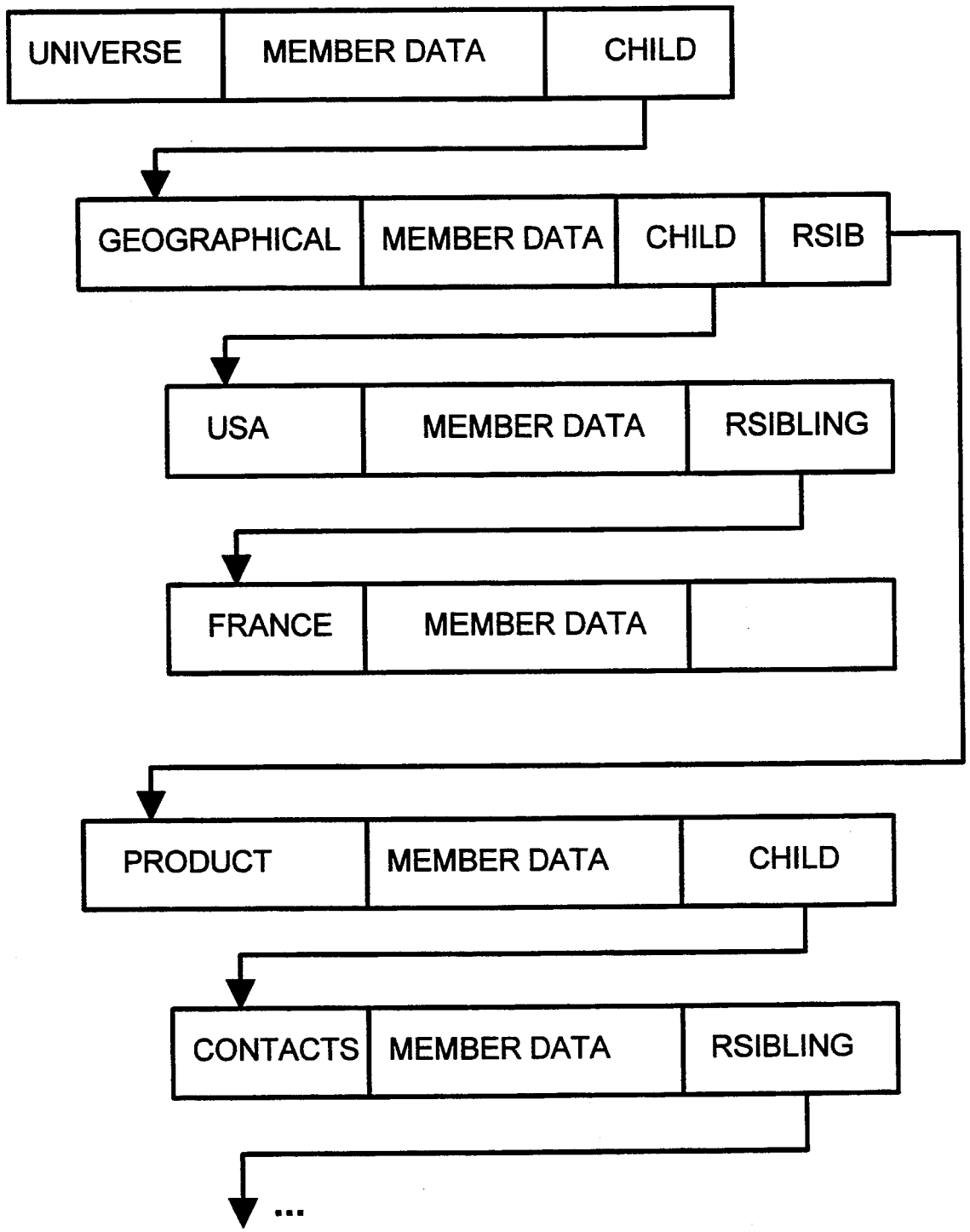
FIG. 7 shows a linked list created from the member structure of FIG. 6.

FIG. 5 is a flow chart of the method of allocating memory and storing data of the present invention. The first step of defining the database structure is to create the structure of the dimensions, or members, as shown at step 1. A representative member structure is shown in FIG. 6, with the members being shown in the form of an outline.

The members at the highest level are referred to as the dimensions of the data, and are the highest level members that can be attributes of data. Underneath each dimension are descendant members, representing the various attributes that data can have in each of the dimensions. In this structure, the dimensions are FINANCIAL ACCOUNTS, TIME, GEOGRAPHICAL, PRODUCT LINE, DISTRIBUTION CHANNELS and TYPE.

Once this outline is created by the user, the database creates a linked list representing the member structure as shown in step 2 in FIG. 5. An example of a linked list is shown in FIG. 6. For each member this linked list contains member data such as the member name, a corresponding member number, level, generation, and security and other status settings. It also contains links to the parent members (next higher level), child members (next lower level), and "left" and "right" siblings (same level). (For ease in locating the members in the linked list, once all the members are defined an alphabetical list is created, including alternative names, which can be searched by a binary search, and which points to the member in the linked list.)

The only other information needed to create the database structure is the dimension groups. The two types of groups are "dense" and "sparse." Dimensions cannot be dense or sparse by themselves, but only when grouped with other dimensions. In the example of FIG. 6, if most cities in the GEOGRAPHICAL dimension have only one DISTRIBUTION CHANNEL and one, but not both, PRODUCT LINE, and if Foods are sold only through Wholesale channels, then most of the potential combinations of GEOGRAPHICAL/PRODUCT LINE/ DISTRIBUTION CHANNEL will never exist, and these dimensions would form a good sparse group.

On the other hand, FINANCIAL ACCOUNTS will generally have data for each TIME period and for every TYPE. These 3 dimensions thus would make a good dense group. While this grouping is transparent to the end user and thus of no concern in and of itself, it does have significant implications for the efficiency of data storage. As will be seen below, this ability to select the dense dimensions is an important feature of the present invention.

Users are generally familiar enough with the structure of their data to select the dimensions which will be dense. This is done at step 3 in FIG. 5. The members of the dense dimensions determine the basic block of data storage allocated in the system. For example, if the three dimensions FINANCIAL ACCOUNTS, TIME and TYPE have 10, 5 and 3 members, respectively, the basic block of data will be 10×5×3, or 150, cells. (As above, a cell is typically 8 bytes to allow for a standard double precision floating point number, but this may be altered if desired.) The structure of the block is described below.

The remaining sparse dimension members are used to create the block pointer structure, as shown at step 4 in FIG. 5, by which a particular block header is located which represents a specific combination of sparse dimension members. The specific block pointer structure is configurable by the user at the time the database is created.

In the preferred embodiment there are two block pointer structures which may be used depending on the sparseness of the data. The first of these is a block pointer array. For most applications this is the preferred structure because it is the fastest. The pointer array contains a pointer for each possible combination of sparse dimension members. Thus if in the above example, the GEOGRAPHICAL, PRODUCT LINE, and DISTRIBUTION CHANNEL dimensions contain 20, 10 and 4 members respectively, the pointer array would contain 800 cells, each containing a pointer. In most applications this array will be much larger, perhaps 1 or 2 megabytes, but this is not unduly large on a server with 16 to 64 megabytes of RAM.

The cells in the pointer array are ordered by incrementing the "first" sparse dimension through its members, then incrementing the "second" sparse dimension by one member and incrementing the first sparse dimension again, and so on until all sparse dimensions have been completely incremented so that there are pointer cells for all possible combinations. It does not matter which sparse dimension is the first, second, etc. since the block contains no structural information, only the pointer in each cell. As a practical matter, the order set forth in the member outline is used to determine the order of the sparse dimensions, and the member outline thus indicates which sparse dimension is first, second and so on so that the location of any particular piece of data may be located, as explained below. There is no need to store member attributes in the block or anywhere else except the member outline.

Each pointer in the array has three possible settings. Upon creation of the array, all pointers are set to point to a dummy empty data block to indicate that no data yet exists. If the user wants to define any combination of sparse dimension members as invalid, the pointer corresponding to that combination can be set to a dummy invalid data block. (There need only be one dummy empty data block and one dummy invalid data block for the entire database, since the purpose is only to indicate those combinations os sparse dimension members which are invalid or for which no data has yet been recorded.) The third possible setting is a pointer to an actual data block which contains all the data containing the particular combination of sparse dimension members represented by the location of the pointer in the pointer array.

The specification of various combinations of dimensions which are invalid serves two purposes. It is first a safety feature which prevents accidental entry of data for combinations which are known to be impossible. For example, if a company makes widgets (product line dimension) and the also have operations in Taiwan (country dimension), but they don't happen to make widgets in Taiwan, then Taiwan/Widgets is an invalid combination for which there should never be any data, regardless of the attributes of other dimensions. Second, when data is consolidated, certain rollups of data in differing dimensions may make sense, but some of these rollup combinations may be of no interest to the user. By specifying them as invalid, the creation of those blocks does not occur during consolidation, saving time and storage.

When an item of data input by the user (FIG. 5, step 5) is to be stored, the sparse dimension members are first used to calculate a "section number" which indicates the position of the cell in the pointer array which corresponds to those sparse dimension members. This is a simple mathematical calculation based upon the member numbers, which reflect the order of dimensions and the number and order of members in each and are contained in the linked list. The corresponding cell is then checked to see what pointer exists for the desired combination of dense dimension members (step 6).

If the pointer points to the dummy invalid data block, an error message is generated since the data is presumed to be invalid (step 7). If the pointer points to the dummy empty data block, then a data block is created (step 8). As above, this data block contains a number of cells corresponding to each possible combination of the dense dimension members. In addition to the actual cells, each block has a block header which contains the pointer to the actual data block, and may also contain additional information as desired by the user.

As with the pointer array, the cells in the data block are ordered by incrementing through all members of the "first" dense dimension, then incrementing the "second" dense dimension and incrementing through the first dense dimension again, and so on until all dimensions have been incremented so that there are cells for all possible combinations. Again it does not matter which dense dimension is the first, second, etc. since the data block also contains no structural information, only the numeric data in each cell (rather than the pointers of the pointer array). As with the pointer array, the order of dimensions in the member outline determines which dimension is first, second and so on, so that the location of any particular piece of data may be located in the same way that the pointer is located, but from the dense dimension attributes. Again there is no need to store member attributes in the data block or anywhere else except the member outline.

Once an actual data block is created for a set of sparse dimension attributes, a pointer to the block header replaces the pointer to the dummy empty data block in the corresponding cell in the block pointer array. (FIG. 5, step 9). All of the cells in the data block are initially set to a null or "missing" value. Individual cells may also again be designated as invalid. The location of the data cell which corresponds to the dense dimensions of the input data is then calculated from the member numbers in the linked list, which again contains the order of dimensions and number and order of dimension members, and the input data value is inserted into that cell (step 10).

When subsequent data values are input, the sparse dimensions are again used to find the corresponding pointer in the block pointer array. If the selected pointer points to the dummy empty data block, a new dense data block is again created. If the pointer points to an actual data block which has already been created, the dense dimensions are then used to determine where in the indicated block to insert the new input data. (FIG. 5, step 10.) If there is more data to input, the system returns to step 5.

Figure 8:
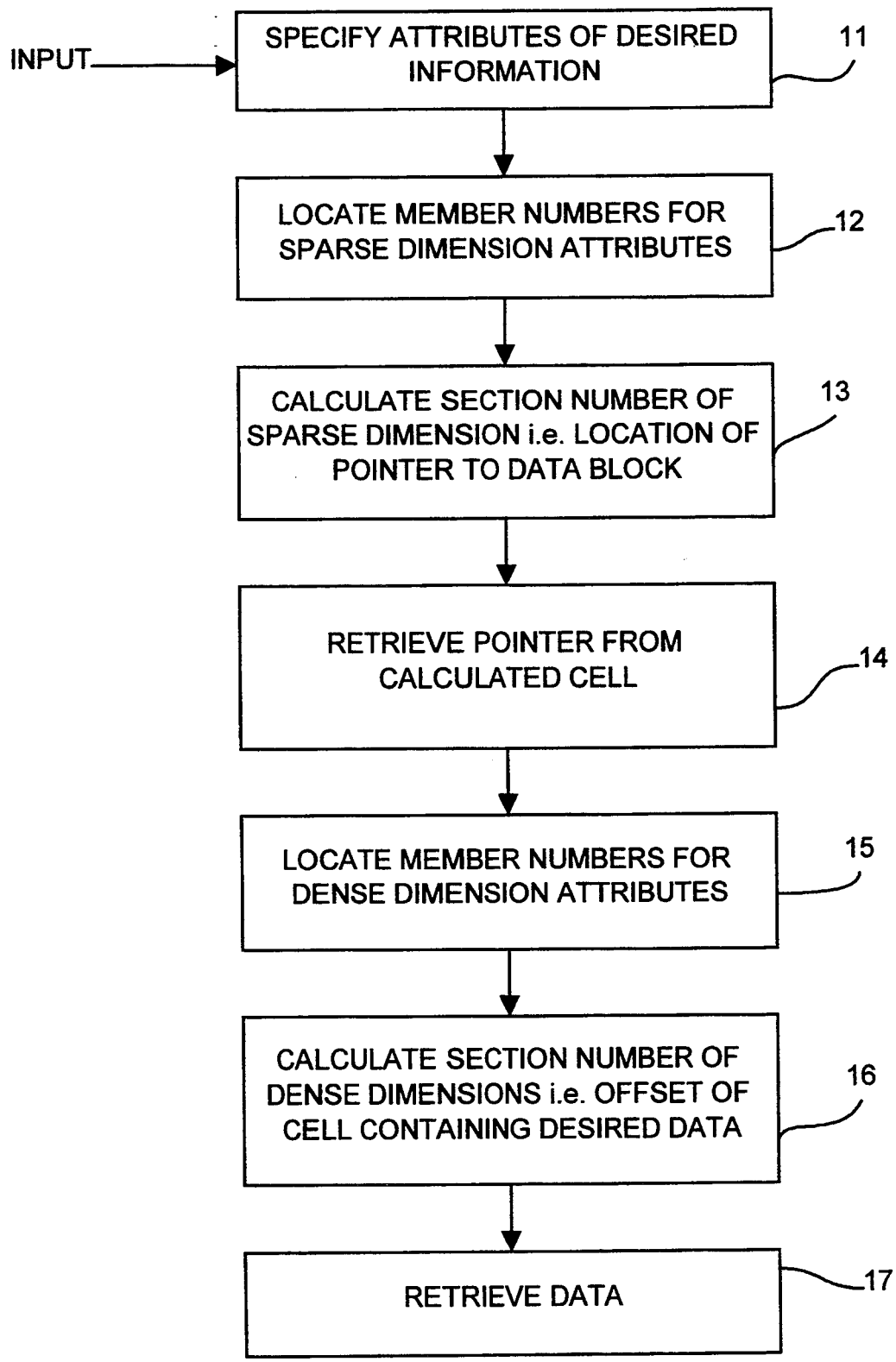
FIG. 8 is a flow chart of the method of retrieving data which has been stored by the method of the present invention.

A flowchart for the retrieval of data is shown in FIG. 8. To locate a particular piece of data, one need only specify the desired member attributes (step 11). The sparse dimension attributes are used to locate the corresponding member numbers from the linked list (step 12), which then are used to calculate the cell in the block pointer array which contains the pointer to the data block where the data is stored (step 13). Once the appropriate data block is located by retrieving the pointer from the block pointer array (step 14), the dense dimension attributes are used to locate the member numbers (step 15) from which the offset in the block is calculated (step 16), and the desired data retrieved from the indicated cell (step 17).

In some instances, however, such as large applications with many sparse dimensions, even the block pointer array can become prohibitively large, possibly even gigabytes. In such cases the block pointer array may not even fit into memory or may occupy too much of the available memory. Moving the array to a disk, even if possible, drastically slows down operation. Thus, an alternative is desirable.

Figure 9:
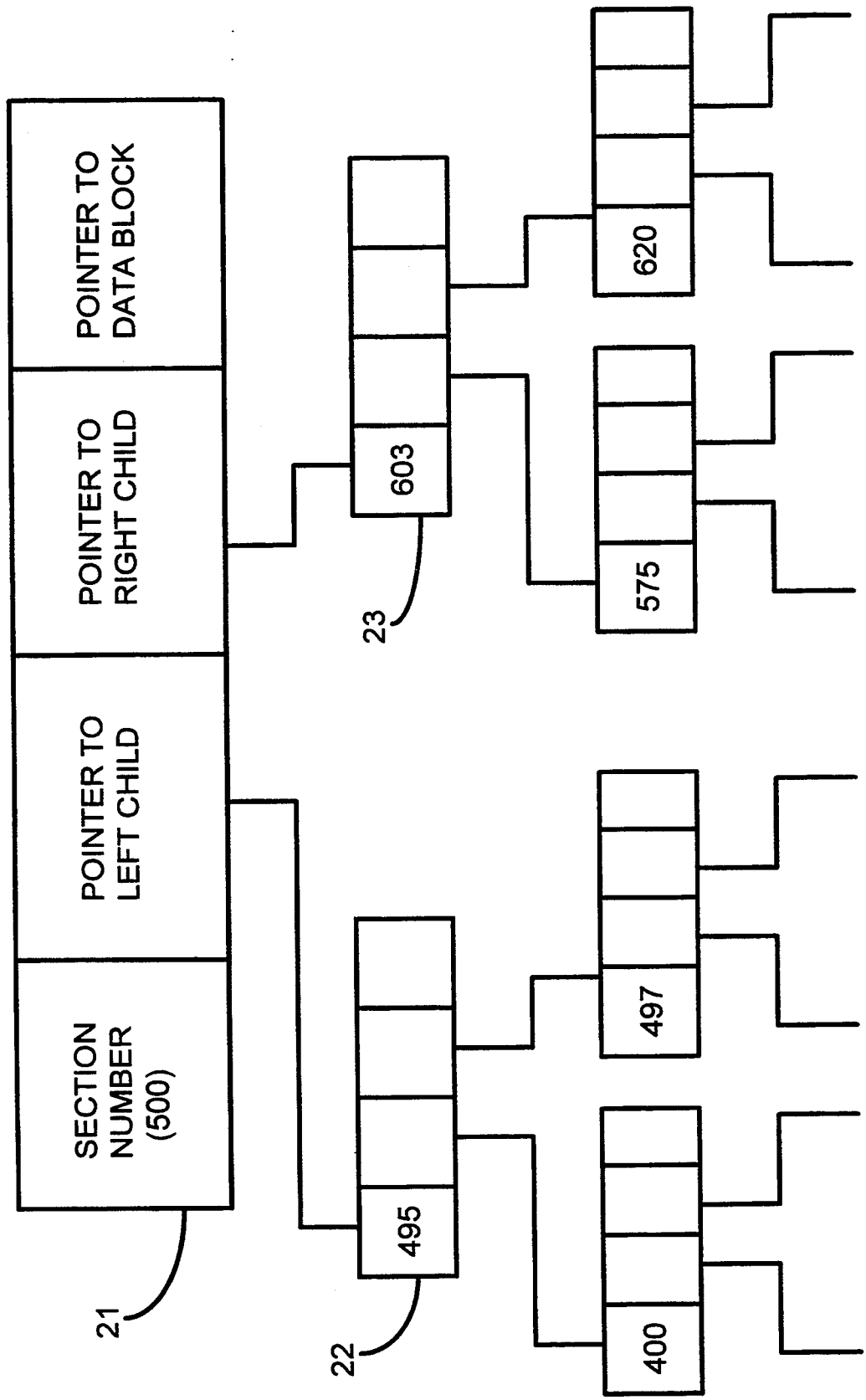
FIG. 9 shows a representative binary tree which may be used in the method of the present invention.

The second type of block pointer structure which may be used in the preferred embodiment is a binary tree. A representative binary tree is shown in FIG. 9. In this approach, no memory is allocated for pointers until the first data block is created, at which time the top link of the tree is created. Each additional block which is created causes another link in the tree to be created as well. Each link has four elements to it. These are the block number, a pointer to the next link with a lower section number, a pointer to the next link with a higher section number, and a pointer to the data block header associated with the section number.

As each piece of data to be input is received, the sparse dimension attributes are examined first, as in the block pointer array approach, and the section number calculated. The section number is the same as the offset would be in the block pointer array, and is calculated the same way from the order of the members as represented by the member numbers in the linked list. The binary tree is scanned as explained below to determine whether there is already a data block corresponding to the specified combination of sparse dimension attributes. If there is such a data block, the dense dimension attributes are then used to calculate the offset in the data block where the data is to be stored.

If no data block exists for the sparse dimension attributes of the data, a new data block is created, just as in the block pointer array method. Here, however, since there is no existing cell in which to put the pointer, a new link in the binary tree is created, which contains the pointer to the new data block. If the section number of the new data block is greater than the section number of the previous link, the new link is placed to the right of the previous link. The appropriate pointers of each link are set to point to the other link as having a higher or lower section number, respectively. As more links are established, the binary tree is created, as shown in FIG. 9. Thus, in FIG. 9 the first link 21 established has a section number, based on the member numbers of the sparse dimension members, of 500. If the section number for the next link 22 is 495, the next link is located as the left child of link 21. The next link 23 having a section number of 603 becomes the right child of link 21, and so on, such that all of the descendant links to the left of each link have lower section numbers than the parent link, and all descendant links to the right of each link have higher section numbers than the parent link. Periodically the tree may be "balanced" or reorganized to make it easier to search, if, for example, the section numbers continually happen to increase, resulting in only right child members- In such a case, a point somewhere in the center of the tree is chosen to become the new top link so that the number of left children and right children is roughly equal.

To locate a piece of data, the section number is calculated from the sparse dimension attributes, just as in the block pointer array approach. However, instead of using this as an offset in the block pointer array as above, the computer now looks to the binary tree to find the section number. Starting at the top link, the computer looks to see if the current link has the same section number as that desired. If so, the computer retrieves the pointer stored in the link, which points to the data block corresponding to the combination of sparse dimension members represented by that section number. If the top link does not contain the desired section number, the computer looks left or right depending upon whether the desired section number is lower or higher than that of that link. This process continues until the link containing the desired section number is located, and the pointer contained in the link which points to the corresponding data block is retrieved. The computer then proceeds as in the case of the block pointer array above, and uses the dense dimension attributes to calculate the offset of the cell in the data block which contains the specific data desired which corresponds to the combination of all of the specified dimension members.

While the binary tree is somewhat slower than the block pointer array approach, in very sparse applications it has sufficient speed that the user should not notice the difference. Since the binary tree is designed to be used only when the sparse dimensions are very sparse, the maximum number of levels of the binary tree which need to be searched is thus expected to be fairly small.

However, the advantage of the binary tree is that only entries for those combinations of the sparse dimension attributes which actually have corresponding data are created, whereas in the block pointer array space must be reserved for every possible sparse dimension member combination. Thus, the binary tree results in greater memory savings than the block pointer array, at some cost in speed.

The binary tree has one additional disadvantage. It is not possible to mark invalid block pointers, i.e. invalid combinations of sparse dimension attributes, at the time of creation of the data base as can be done with the block pointer array, since only links which represent blocks with actual data are created. This may be handled with a table of such invalid combinations which are then be evaluated each time a block is about to be created. Specification of invalid combinations of dense dimension members is handled the same way with either upper level structure.

Thus, the dimensions selected as dense, and the number of members in each dimension, determine the size of the dense data blocks. This "variable block size" is not believed to have been implemented previously in such applications and allows the user to choose a very careful balancing of several factors. First, the selection of the specific dimensions for the block should be such that the density of the data relative to those dimensions is high and wasted storage is thus minimal. Second, enough dimensions may be selected for the data blocks so that the number of combinations of the remaining (i.e. non-data block) dimensions is small enough that they can be stored in the upper level block pointer array to allow direct calculation of addresses, or, in extremely large applications where direct calculation is not possible, that at least the size of the binary tree or other upper level structure can be kept to a reasonable, customizable size so that the search algorithm is fast. Third, it is desirable to keep the block size within a reasonable range for very large problems where some disk paging may be required. If paging is required, access of a single cell may require that the whole block be moved back into memory, and if the block size is too large, paging becomes very slow. As above, once the dense and sparse dimensions are selected, the blocks are created automatically and the user is not aware of it.

Also incorporated in this new database design is a method of both specifying data for input to the database and for extracting required data which is unique. This is a "natural ordering syntax" which allows the database to read and understand standard reports, tables, and spreadsheets without requiring a separate specification of how to map these objects to the data structure. For example, the input object (or desired output report) might be a spreadsheet which deals with widgets (Product Line) in Taiwan (Country) and a selection of members from the Accounts, Time, and Scenario (Budget/Actual/Variance) dimensions such as the following:

|          | Taiwan Widgets |     |     |        |     |     |
|----------|------|-----|-----|--------|-----|-----|
|          | Budget |   |     | Actual |     |     |
|          | Jan  | Feb | Mar | Jan    | Feb | Mar |
| Revenues | 10   | 12  | 13  | 10     | 9   | 12  |
| Expenses | 8    | 9   | 7   | 8      | 8   | 8   |
| Profit   | 2    | 3   | 6   | 2      | 1   | 4   |

Or the spreadsheet could contain the same information, but in a very different layout:

|        | Widgets Taiwan |          |        |
|--------|----------|----------|--------|
|        | Revenues | Expenses | Profit |
| Jan    |          |          |        |
| Budget | 10       | 8        | 2      |
| Actual | 10       | 8        | 2      |
| Feb    |          |          |        |
| Budget | 12       | 9        | 3      |
| Actual | 9        | 8        | 1      |
| Mar    |          |          |        |
| Budget | 13       | 7        | 6      |
| Actual | 12       | 8        | 4      |

Or, it might be a general ledger output file or an SQL (relational database) table containing the same data in still another form:

| Taiwan | Widgets Budget Jan | Revenues 10 |
|--------|--------------------|-------------|
| Taiwan | Widgets Budget Feb | Revenues 12 |
| Taiwan | Widgets Budget Mar | Revenues 13 |
| Taiwan | Widgets Actual Jan | Revenues 10 |
| Taiwan | Widgets Actual Feb | Revenues 9  |
| Taiwan | Widgets Actual Mar | Revenues 12 |
| Taiwan | Widgets Budget Jan | Expenses 8  |
| Taiwan | Widgets Budget Feb | Expenses 9  |
| Taiwan | Widgets Budget Mar | Expenses 7  |
| Taiwan | Widgets Actual Jan | Expenses 8  |
| Taiwan | Widgets Actual Feb | Expenses 8  |
| Taiwan | Widgets Actual Mar | Expenses 8  |
| Taiwan | Widgets Budget Jan | Profit 2    |
| Taiwan | Widgets Budget Feb | Profit 3    |
| Taiwan | Widgets Budget Mar | Profit 6    |
| Taiwan | Widgets Actual Jan | Profit 2    |
| Taiwan | Widgets Actual Feb | Profit 1    |
| Taiwan | Widgets Actual Mar | Profit 4    |

The "natural ordering syntax" method is an ideal interface between the multidimensional database and commonly used external objects because it can "understand" these objects precisely the way they are naturally laid out by users and other software products, without the user having to specify a separate definitional mapping of how to relate each cell in the varying objects to the database.

This method of analyzing the input/output object works in the following way. The object records are scanned from left to right on each line, from the first line to the last. All of the items found are identifiable as either (1) data values; (2) dimension member names or pseudonyms; (3) tokens to skip; (4) tokens to ignore; or (5) invalid tokens which generate an error.

The database creates a structure which is called an "odometer" because it operates similar to an automobile odometer in that each dimension is represented by one barrel (ring) on the odometer, and the numbers on each of these barrels represent the dimension member indices of the currently "selected" or active members of the dimension represented by that barrel. The odometer differs from an automotive odometer in that the numbers (indices) on a barrel are not necessarily consecutive, and in that the number of indices on a barrel may differ from the number on the other barrels. Further, the number of indices on a particular barrel can change at any point in the operation, varying from 1 to the total number of members in the dimension represented by that barrel. Finally, the order of the barrels in the odometer can also change during the load/extract operation.

The odometer is initially empty. As the object is scanned, the odometer is modified according to the following rules.

1. When a member token is encountered, its index is looked up in the database (as above, there is a sorted binary search list containing all member names, aliases, skip tokens, and ignore tokens, which gives a pointer to the member link of that token's name in the outline structure, which contains the index) and the index is added to the odometer barrel for that dimension.

2. If the member token encountered is from the same dimension as the preceding token (with no data value tokens intervening), the previous indices on the barrel remain, and the new index is simply added. Otherwise, that barrel is reset to contain only the current member token's index. When a barrel contains more than one index, it represents a data range. When a barrel gets a second index and becomes a range, it is moved to the first barrel position on the odometer and the other barrels are shifted back (to the right). This causes the most recently created ranges to be ordered first on the odometer. For example, at the point where "January," "February," and "March" have been encountered and processed in the first example spreadsheet above, the odometer would look like:

| Barrel 1 | Barrel 2 | Barrel 3 | Barrel 4 | Barrel 5 |
|----------|----------|----------|----------|----------|
| Jan      | Budget   | Widgets  | Taiwan   | —        |
| Feb      | Actual   |          |          |          |
| Mar      |          |          |          |          |

After the next token, Revenues, is encountered, the odometer would have "Revenues" as the only member in Barrel 5. (Note that it is the members' indices that are actually stored in the barrels, not their names, which are shown here only for illustration.)

Thus, the odometer now looks like this:

| Barrel 1 | Barrel 2 | Barrel 3 | Barrel 4 | Barrel 5 |
|----------|----------|----------|----------|----------|
| → Jan    | Budget   | Widgets  | Taiwan   | Revenues |
| Feb      | Actual   |          |          |          |
| Mar      |          |          |          |          |

3. When a data item is encountered, it triggers a store or retrieve operation based on the current odometer setting (indicated by the members on the line pointed to by the - - - → above). If this is a data load (store), then the data value is stored into the data cell whose attributes match the members whose indices are reflected in the current odometer setting. In other words, the value 10 is stored in the data cell whose attributes are "January Budget Widgets Taiwan Revenues." This store operation can be done very rapidly by calculating offsets based on the barrel indices (except in the case where the upper level structure is a binary tree, in which case a search must be performed to get the upper level block pointer; the offset in the block is still obtainable by direct calculation). If the operation is retrieval, the data value encountered in the object is replaced by the current database cell, which is looked up in the same way.

4. When a data item is encountered, and one or more of the barrels have ranges (more than one index on the barrel), it can be assumed that there will be a consecutive range of data values in the object being scanned, directly following the one just found. The odometer is therefore incremented, starting with the leftmost barrel, and a data cell is transferred for each increment. When the first barrel has incremented through its entire range, the next increment is back to its first index (just like a car odometer), and the next barrel increments. If that barrel is at the end of its range, the next increments, and so on. The result is that a consecutive range of data values in the object are transferred to or from the proper locations in the database and object as intended. After all the barrels have incremented through their ranges, the odometer has returned to the state it was in prior to encountering that first data value.

In this example, since two ranges have been encountered (January/ February/March and Budget/Actual), with 3 and 2 members, respectively, it is expected that there will be six consecutive data items which need no further description to understand how to map them. Of course, this technique is not limited to the illustrated example, but can be used with any logical arrangement of data which is to be loaded or retrieved.

5. If a skip token is encountered, it means that although this is (or once was) a valid member token, it is not germane to the database at this point and no data with this attribute is to be loaded or extracted. This is handled by skipping the token, and scanning the object as before, ignoring all intervening tokens until another member token from the same dimension as the skip token is encountered. This effectively skips all data which has the unwanted attribute, and ensures that the odometer does not have a skip token index as one of its index values.

6. Ignore tokens are ignored as if they had not even been found. This is useful if, for example, reports or spreadsheets being examined have title or notes information which has no bearing on the data being loaded-/extracted.

This natural ordering syntax has been shown to be an effective method with which to interface user objects such as spreadsheets, reports, tables, etc. to the database and handles most such objects because that is the natural way in which most people organize their information. Provision can easily be made for cases where, for example, the "row names" are placed in the middle of a data row. The assumption that member attributes are always on the left and the data is on the right in spreadsheet rows or table records is not critical to the method, since that can be taken into account when the record is being scanned. Also, when an "unnatural" or inconsistent arrangement is encountered there can be a method of handling errors. This method makes possible a very seamless integration of data retrieval and store operations within existing popular commercial spreadsheets, word processors, etc., with minimal development difficulty.

While the preferred embodiment discussed herein utilizes a two-level structure, in which the upper level points directly to the data blocks, there is no reason that the upper level pointer structure could not consist of more than one level, so that the top level points to one or more intermediate levels, which in turn point to the data blocks. For example, in a very large application of 6 or more dimensions, it might be appropriate to create a structure of the variable data blocks of dense dimension data, an intermediate level containing a set of pointer arrays each of which represents the combinations of 2 or 3 dimensions which are somewhat sparse, and a top level of pointers representing the combinations of 2 or 3 dimensions which are extremely sparse.

Thus, assume that there are six dimensions, A to F, and each has 3 members, represented by 1 to 3, so that the members of A are A1, A2 and A3, with the members of B to F similarly designated. If A and B are the most dense, C and D are sparse, and E and F are very sparse, under the two level structure, the data blocks would contain all combinations of A and B and the upper level block point pointer structure would contain combinations of C to F, of which there are 81 possible combinations.

Figure 10:
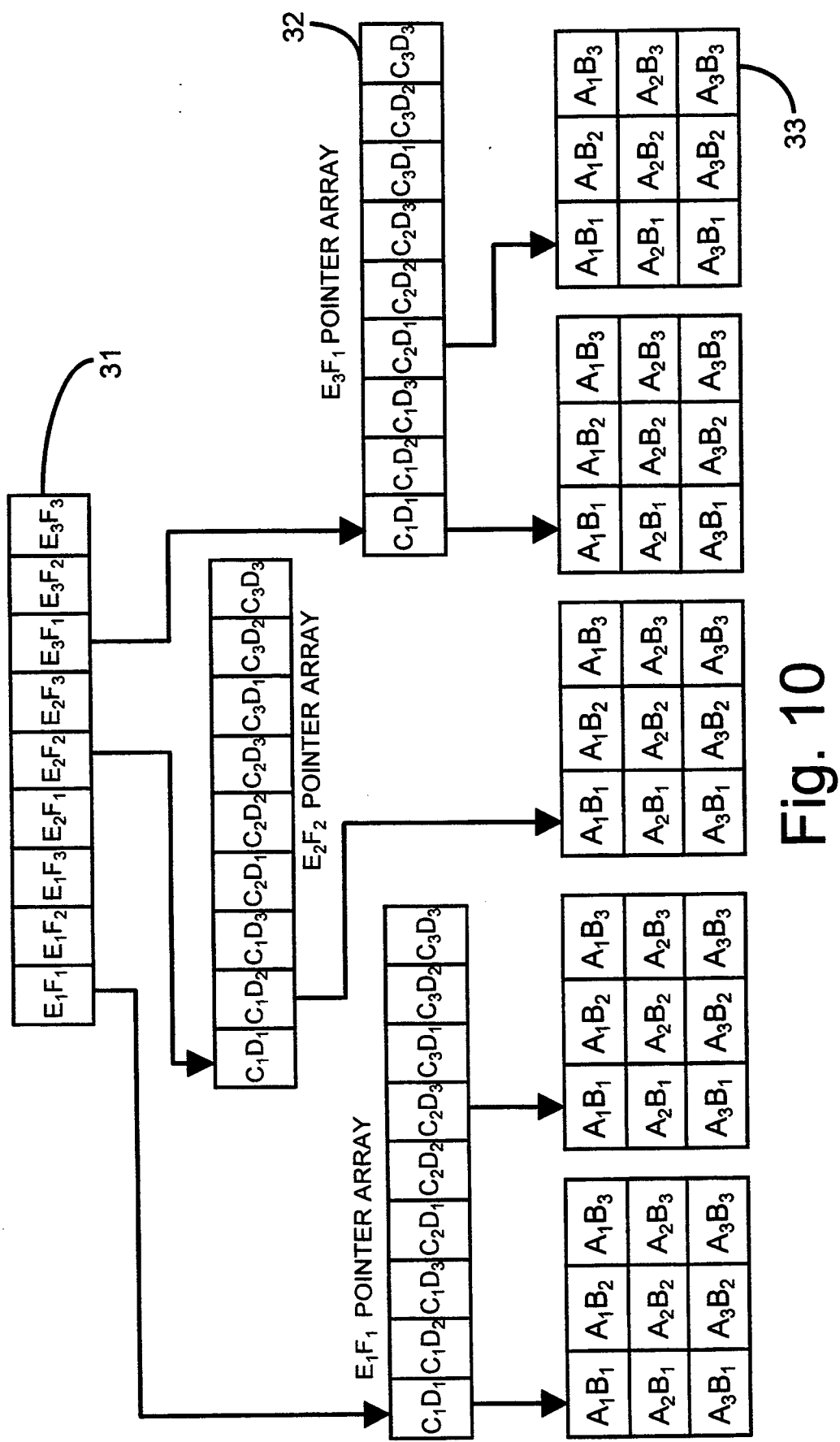
FIG. 10 shows an alternative upper level pointer structure which may be used in the present invention.

On the other hand, a three level structure might be as shown in FIG. 10. Pointers to actual data are indicated by arrows, and the combinations from which there are no arrows are filled with pointers to the dummy empty or invalid data blocks. The top level 31 contains the nine possible combinations of dimensions E and F. Only three of these combinations are represented by actual data, and thus show pointers to a lower level. The intermediate level 32 shows the nine possible combinations of dimensions C and D for each of the three combinations of dimensions E and F for which there is data. In turn, of the 27 shown combinations of dimensions C and D, there are pointers to 5 actual data blocks 33, each of which contains the nine possible combinations of dimensions A and B, again for the combinations of dimensions C to F indicated.

If a block pointer array is used, this structure requires less memory than the two level structure above, since the two level structure would require all possible combinations of dimensions C to F to be represented in the array. Thus, since there are 81 possible combinations of dimensions C to F (3×3×3×3), if each pointer uses 4 bytes, a total of 81×4 or 324 bytes would be needed for the array. In the three level structure of FIG. 10, the top level 31 has 9 pointers, and the intermediate level 32 has 27 pointers, for a total of 36. Thus, 36×4 or 144 bytes are required, and the size of the two levels is significantly less than the size of one four-dimensional pointer array.

If a two level structure is used with a binary tree, only 5 links are required (i.e., one to each of the five data blocks), with each link containing information representing the members of the four dimensions C to F which are represented. However, each link requires more information, 4 bytes for the section number, 4 bytes for the left pointer, 4 bytes for the right pointer, and 4 bytes for the block pointer, for a total of 16 bytes per link. For five links, a total of 80 bytes is thus needed. While the size of the binary tree is somewhat smaller than the three level structure in this example, the difference is less than with the two level structure. Also, a search and compare is required to find the link having the desired section number, a problem which gets worse the larger the binary tree becomes, while in the three level structure only one more calculation of a section number or offset is necessary.

In very sparse applications, it is possible that the three level structure could even be smaller than the binary tree. Given that the binary tree must also be searched, there is no question that the three level structure would be preferable in such a case. Also, it is possible to mix pointer structures, so that where there is more than one upper level pointer structure, one or more may be block pointer arrays and one or more may be binary trees, depending upon the application.

Figure 11:
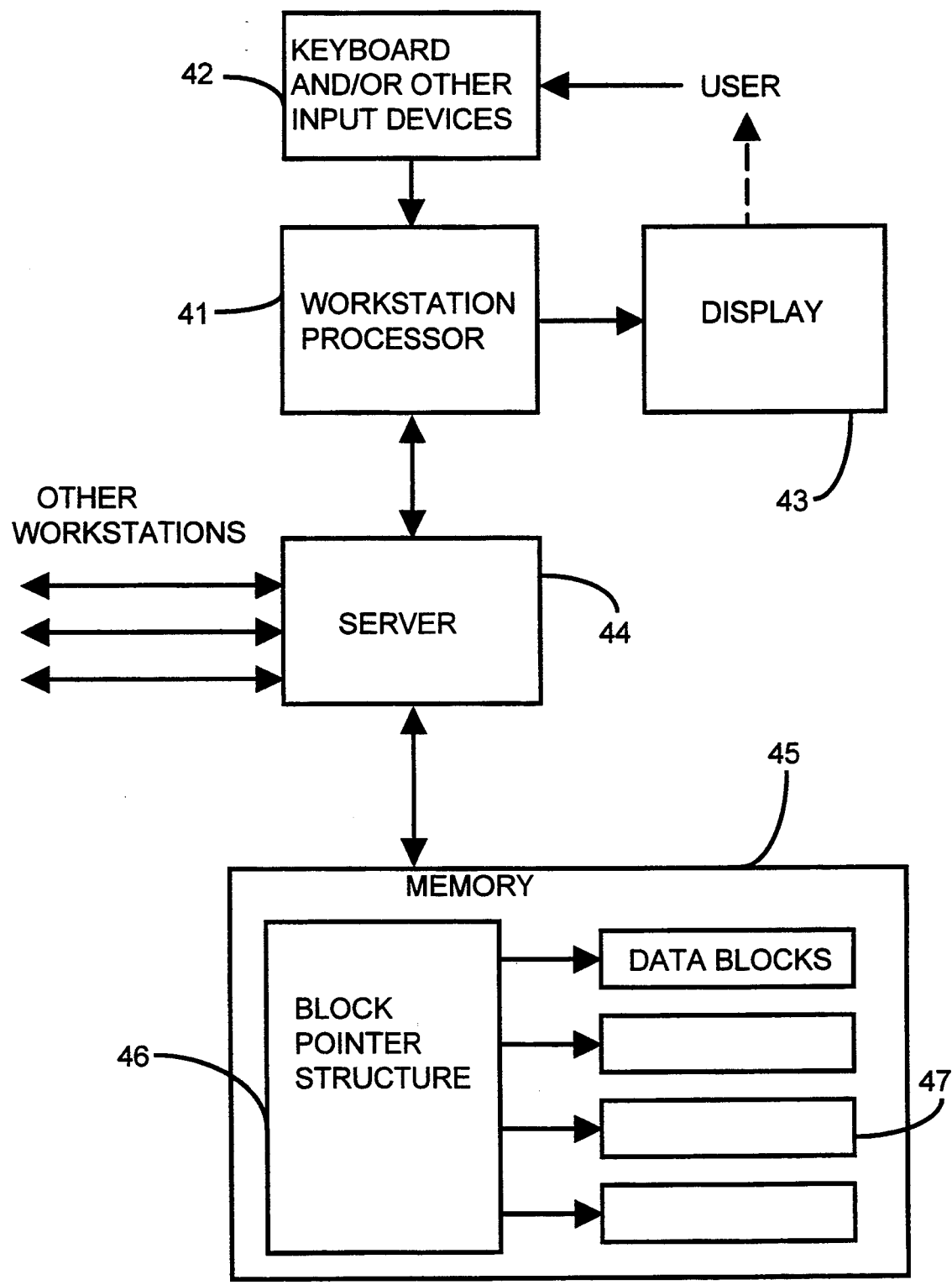
FIG. 11 shows a preferred embodiment of the present invention, in which a server provides data stored by the method of the present invention to multiple workstations.

In the preferred embodiment, the system runs on a server which allows a number of users with workstations to access the database simultaneously, as shown in FIG. 11. The user uses a workstation 41 which contains the spreadsheet he or she is using, and which has a keyboard or other input device 42 and a display or other output device 43. The user interfaces with the server 44 through the workstation 43, so that other then the appropriate commands for retrieving data the server 44 is completely transparent to the user once the data is loaded. The server controls access to the data in memory, which contains the block pointer structure 46 and data blocks 47 as described above, for a number of workstations. This presents no problem even where more than one user wishes to access the same cell unless the data in the cell is being changed. In that situation, the system can be instructed to "lock" the cell until the data is changed so that only one change is made at a time. Each workstation is preferably a personal computer containing a standard spreadsheet program, such as Excel ® from Microsoft or 1-2-3 ® from Lotus. The spreadsheet works as the front end to the database, and once the database is created the user never sees anything but the spreadsheet, with which he or she is presumably already familiar. Even the member structure of FIG. 6 can be created in the spreadsheet. FIG. 12 shows a sample member structure defined in Excel ®, in fact the member structure represented by FIGS. 1 to 4d.

As with computerized spreadsheets, formulas may be used in the present invention. However, unlike spreadsheets, where a formula is "attached" to a specific cell, in the present invention all formulas, which are merely relationships with other cells, are performed by the computer use of the section numbers or offsets of the cells in question. Thus, a formula will tell the computer to obtain data corresponding to one or more offsets, perform some specified operation on it and store the result in the cell corresponding to another offset. Similarly, consolidation of data is accomplished by simply specifying the "range" of items desired to be consolidated, i.e. the offsets of the desired data items, and the computer retrieves and adds them automatically. The speed with which data may be retrieved in the present invention makes possible very rapid calculation and consolidation, believed to be unmatched by any presently available multi-dimensional database.

Another advantage to the present invention is that all dimensions, and all data, are treated equally. Thus, unlike some of the prior art products described above, there is no difference, from dimension to dimension, in the functionality for performing calculations or otherwise manipulating or reporting data. If the user wishes to view only data relating to units sold, rather than dollar sales, for example for forecasting purposes, this is possible by simply specifying the appropriate dimension members. Appropriate "twisting" of the dimensions of the member structure of FIG. 10 results in the views shown in FIGS. 4a to 4d.

From the above description, it will be apparent that the invention disclosed herein provides a novel and advantageous apparatus for storing and retrieving multi-dimensional data, such as financial data, in computer memory which maximizes the speed of accessing the memory while minimizing the amount of memory needed to store such data. The foregoing discussion discloses and describes merely exemplary methods and embodiments of the present invention. As will be understood by those familiar with the art, the invention may be embodied in other specific forms without departing from the spirit or essential characteristics thereof. For example, other types of upper level structure, such as a HASH type incorporating levels of bit maps, could be used for even more sparse applications, although no application has yet been found which the binary tree cannot handle with reasonable speed, even with 12 to 15 dimensions. Accordingly, the disclosure of the present invention is intended to be illustrative, but not limiting, of the scope of the invention, which is set forth in the following claims.

What is claimed is:

1. A method of storing multi-dimensional data, each unit of which is identified by one or more members of each of a plurality of dimensions, in computer memory, comprising:

selecting a first group of a number of dimensions and a second group of a number of dimensions;

allocating a first portion of memory which contains cells corresponding to combinations of the members of the first group of dimensions;

allocating a second portion of memory which contains a plurality of data blocks, each containing cells corresponding to combinations of the members of the second group of dimensions, wherein each data block corresponds to a different combination of the first group of dimensions, and the size of the data blocks depends upon the dimensions selected and the number of members in each;

storing each unit of data in the data block which corresponds to the combination of members of the first group of dimensions which identifies that unit of data, and in the location within that data block which corresponds to the combination of members of the second group of dimensions which identifies that unit of data; and inserting a pointer to each data block corresponding to a particular combination of members of the first group of dimensions in the cell in the first portion of memory which corresponds to the same combination of members of the first group of dimensions.

2. The method of claim 1 wherein the step of inserting a pointer to each data block further comprises the step of selecting the manner in which the cells in the first portion of memory are to be organized.

3. The method of claim 1 wherein the first portion of memory is a block pointer array which contains all possible combinations of the members of the first group of dimensions.

4. The method of claim 1 wherein the first portion of memory is a binary tree containing only those combinations of the members of the first group of dimensions for which data exists.

5. The method of claim 1 further comprising the step of selecting an order for the dimensions and their members, and wherein the step of creating a plurality of data blocks further comprises ordering the cells in each data block in the same order established for the dimensions and members.

6. The method of claim 5 wherein the step of selecting an order for the dimensions and their members comprises the step of creating an outline of the dimensions and their members in the desired order.

7. The method of claim 5 wherein the step of allocating a second portion of memory further comprises arranging the cells contained in each block in an order corresponding to the order of the dimensions and their members.

8. The method of claim 7 wherein the multi-dimensional data is organized in a regular pattern, and the step of storing the data further comprises the step of recognizing the pattern in which the data is organized and inserting each unit of data into the corresponding cell in the corresponding data block based upon that pattern.

9. An apparatus for storing multi-dimensional data, each unit of which is identified by one or more members of each of a plurality of dimensions, in computer memory, comprising:
input means for selecting a first group of a number of dimensions and a second group of a number of dimensions;
means for allocating a first portion of memory which contains cells corresponding to combinations of the members of the first group of dimensions;
means for allocating a second portion of memory which contains a plurality of data blocks, each of which contains cells corresponding to combinations of members of the second group of dimensions, and wherein each data block corresponds to a different combination of the first group of dimensions, and the size of the data blocks depends upon the dimensions selected and the number of members in each;
means for storing each unit of data in the data block which corresponds to the combination of members of the first group of dimensions which identifies that unit of data, and in the location within that data block which corresponds to the combination of members of the second group of dimensions which identifies that unit of data; and
means for inserting a pointer to each data block corresponding to a particular combination of members of the first group of dimensions in the cell in the first portion of memory which corresponds to the same combination of members of the first group of dimensions.

10. The apparatus of claim 9 further comprising means for selecting the manner in which the cells in the first portion of memory are to be organized.

11. The apparatus of claim 9 wherein the first portion of memory is a block pointer array which contains all possible combinations of the members of the first group of dimensions.

12. The apparatus of claim 9 wherein the first portion of memory is a binary tree containing only those combinations of the members of the first group of dimensions for which data exists.

13. The apparatus of claim 9 further comprising means for selecting an order for the dimensions and their members, and wherein the means for creating a plurality of data blocks further comprises ordering the cells in each data block in the same order established for the dimensions and members.

14. The apparatus of claim 13 wherein the step of selecting an order for the dimensions and their members comprises means for creating an outline of the dimensions and their members in the desired order.

15. The apparatus of claim 13 wherein the means for allocating a second portion of memory further comprises means for arranging the cells contained in each block in an order corresponding to the order of the dimensions and their members.

16. The apparatus of claim 15 wherein the multi-dimensional data is organized in a regular pattern, and the means for storing the data further comprises the means for recognizing the pattern in which the data is organized and inserting each unit of data into the corresponding cell in the corresponding data block based upon that pattern.

17. An apparatus for retrieving multi-dimensional data, each unit of which is identified by one or more members of each of a plurality of dimensions, comprising:
memory means containing the multi-dimensional data, in which a first portion of the memory contains cells corresponding to combinations of the members of a first group of one or more of the dimensions and a second portion of the memory contains a plurality of data blocks, each having cells corresponding to combinations of the members of a second group of one or more of the remaining dimensions, and wherein the cells in the first portion of memory contain pointers to the data blocks which correspond to the combinations of the members of the first group of dimensions represented by the cells;
input means for receiving input signals from a user which indicate the members of the dimensions of the data desired by the user; and
processing means responsive to the input signals for calculating the location of the cell in the first portion of memory containing the pointer to the block of data which contains the desired data, then calculating which cell within the block of data indicated by the pointer contains the data, and retrieving the data from the indicated cell.

18. An apparatus for allowing a plurality of users to retrieve multi-dimensional data, each unit of which is identified by one or more members of each of a plurality of dimensions, comprising:
memory means containing the multi-dimensional data, in which a first portion of the memory contains cells corresponding to combinations of the members of a first group of one or more of the dimensions and a second portion of the memory contains a plurality of data blocks, each having cells corresponding to combinations of the members of a second group of one or more of the remaining dimensions, and wherein the cells in the first portion of memory contain pointers to the data blocks which correspond to the combinations of the members of the first group of dimensions represented by the cells;
a plurality of input means for receiving input signals from users which indicate the members of the dimensions of the data desired by the users;
a plurality of processing means responsive to the input signals for generating command signals;
server means responsive to the command signals from the plurality of processing means for calculating the location of the cell in the first portion of memory containing the pointer to the block of data which contains the data desired by each user, then calculating which cell within the block of data indicated by the pointer contains the data, and retrieving the data from the indicated cell.

19. A method of retrieving multi-dimensional data, each unit of which is identified by one or more members of each of a plurality of dimensions, and which is stored in memory in which a first portion of the memory contains cells corresponding to combinations of the members of a first group of one or more of the dimensions and a second portion of the memory contains a plurality of data blocks, each having cells corresponding to combinations of the members of a second group of one or more of the remaining dimensions, and wherein the cells in the first portion of memory contain pointers to the data blocks which correspond to the combinations of the members of the first group of dimensions represented by the cells, comprising:

means for receiving input signals from a user which indicate the members of the dimensions of the data desired by the user;

means for calculating from the input signals the location of the cell in the first portion of memory containing the pointer to the block of data which contains the desired data;

means for calculating from the input signals which cell within the block of data indicated by the pointer contains the desired data; and retrieving the data from the indicated cell.

* * * * *

US005359724C1

(12) EX PARTE REEXAMINATION CERTIFICATE (5149th)

United States Patent
Earle

(10) Number: US 5,359,724 C1
(45) Certificate Issued: Jul. 19, 2005

(54) METHOD AND APPARATUS FOR STORING AND RETRIEVING MULTI-DIMENSIONAL DATA IN COMPUTER MEMORY

(75) Inventor: Robert J. Earle, Sunnyvale, CA (US)

(73) Assignee: Arbor Software Corporation, Santa Clara, CA (US)

Reexamination Request:
No. 90/004,698, Jul. 11, 1997
No. 90/004,934, Mar. 2, 1998

Reexamination Certificate for:
Patent No.: 5,359,724
Issued: Oct. 25, 1994
Appl. No.: 07/860,443
Filed: Mar. 30, 1992

(51) Int. Cl.[7] .......................... G06F 12/02; G06F 17/30
(52) U.S. Cl. ...................... 707/205; 707/100; 707/102
(58) Field of Search ................................ 707/100–102, 707/1, 3, 205, 503

(56) References Cited

U.S. PATENT DOCUMENTS

| | | | | |
|---|---|---|---|---|
| 3,624,616 A | * | 11/1971 | Patel | 395/410 |
| 4,051,551 A | * | 9/1977 | Lawrie et al. | 395/495 |
| 4,313,159 A | * | 1/1982 | Shoap | 395/310 |
| 4,468,728 A | * | 8/1984 | Wang | 395/601 |
| 4,570,236 A | * | 2/1986 | Rebel et al. | 395/421.1 |
| 4,611,272 A | * | 9/1986 | Lomet | 395/603 |
| 4,809,156 A | * | 2/1989 | Taber | 395/421.07 |
| 5,033,009 A | * | 7/1991 | Dubnoff | 395/764 |
| 5,055,998 A | * | 10/1991 | Wright et al. | 395/764 |
| 5,115,504 A | * | 5/1992 | Belove et al. | 395/611 |
| 5,130,924 A | * | 7/1992 | Barker et al. | 395/770 |
| 5,247,632 A | * | 9/1993 | Newman | 395/401 |
| 5,257,365 A | * | 10/1993 | Powers et al. | 395/611 |
| 5,272,628 A | * | 12/1993 | Koss | 395/764 |
| 5,280,547 A | * | 1/1994 | Mahoney | 382/302 |
| 5,359,724 A | | 10/1994 | Earle | 707/205 |

FOREIGN PATENT DOCUMENTS

| EP | 0 349 462 A2 | * | 1/1990 | G06F/15/20 |
|---|---|---|---|---|
| EP | 0 379 778 A2 | * | 8/1990 | G06F/12/10 |
| EP | 0 460 970 A2 | * | 12/1991 | G06F/15/70 |

OTHER PUBLICATIONS

Baron et al., "Data Structures and their Implementation," Van Nostrand Reinhold, pp. 150 and 218–219, 1980.*
Bauer et al., "Compiler Construction—An Advanced Course," in Lecture Notes in Computer Science, Springer–Verlag, pp. 210–214, 1976.*
Bentley, "Multidimensional Binary Search Trees in Database Applications," IEEE Transactions on Software Engineering, vol. SE–5, No. 4, pp. 333–340, Jul. 1979.*
Bestougeff, "Designing the Database Management System," in Rumble et al., Database Management in Science and Technology, North–Holland, pp. 119–167, 1984.*
Brooks, "Data Types and Structures in Science and Technology," in Rumble et al., Database Management in Science and Technology, North–Holland, pp. 15–37, 1984.*
Deen, "Fundamentals of Data Base Systems," Hayden, pp. 186–187, 1977.*
Edwards, "Generalized Arrays (Lists) in APL," in Gjerlov et al., APL Congress 73, North–Holland, pp. 99–105, 1973.*

(Continued)

*Primary Examiner*—Greta L. Robinson

(57) ABSTRACT

A method and apparatus for storing and retrieving multi-dimensional data in which a multi-level data structure is defined wherein one level contains those dimensions chosen by the user to result in dense data and the other level contains the remaining sparse data combinations. The dense dimensions specified in any given case are used to determine the basic block size used to store information. The remaining sparse dimensions are used to create the upper level structure which is used to point to the block which containes the desired information. Depending upon the sparseness of the data, different types of upper level structure may be used. Both the variable data block size and the choice of pointer structure may be used to balance the memory required against the speed of retrieval. Once the data structure is created, the data in the data blocks, and the pointers in one type of upper level pointer structure, may be retrieved by simple calculation of the offset of the desired cell in memory rather than requiring a search.

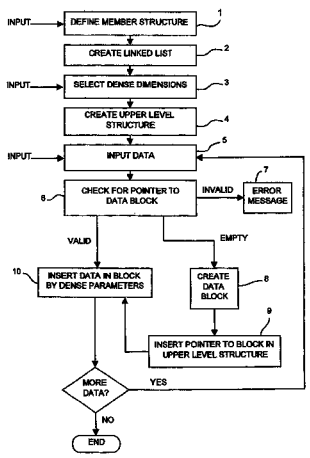

OTHER PUBLICATIONS

"EIS–EPiC Builders Guide Version 2.10," published by Planning Sciences plc, Sep. 1990.*
Gotlieb et al., "Data Types and Structures," Prentice–Hall, pp. 169–243, 1978.*
Gries, "Compiler Construction for Digital Computers," John Wiley & Sons, pp. 175–179, 1971.*
Griswold et al., "The SNOBOL4 Programming Language," 2nd ed., Prentice–Hall, pp. 113–115, 1971.*
Gull et al., "Recursive Data Structures in APL," Communications of the ACM, vol. 22, No. 1, pp. 79–96, Jan. 1979.*
Hentzel et al., "Short Communication—A Practical Solution for a Large Sparse Matrix," Software—Practice and Experience, vol. 18(3), pp. 279–283, Mar. 1988.*
Hsaio et al., "Database Machine Architecture in the Context of Information Technology Evolution," Proceedings of the Third International Conference on Very Large Databases, Tokyo, Japan, IEEE, pp. 63–65, 1977.*
Jensen et al., "PASCAL User Manual and Report," Springer–Verlag, pp. 36–39, 1975.*
Kernighan et al., "The C Programming Language," Prentice–Hall, pp. 103–110, 1978.*
Knuth, "The Art of Computer Programming—vol. 1 Fundamental Algorithms," Varga et al., eds., Addison–Wesley Publishing Co., Inc., pp. 295–302, 1969.*
Lee et al., "Quintary Trees: A File Structure for Multidimensional Database Systems," ACM Transactions on Database Systems, vol. 5, No. 3, pp. 339–353, Sep. 1980.*
Lindsey et al., "Informal Introduction to ALGOL 68," Rev'd ed., North–Holland, p. 141, 1977.*
Liou et al., "Multi–Dimensional Clusteringfor Data Base Organizations," Information Systems, vol. 2, No. 4, pp. 187–198, 1977.*
Low, "Automatic Coding: Choice of Data Structures," Birkhauser, pp. 16–20, 1976.*
Nelson et al., "GIM–1, A Generalized Information Management Language and Computer System," Spring Joint Computer Conference, pp. 169–173, 1967.*
Rose, "Inside Macintosh—vol. V," published by Apple Computer, Inc., 1986.*
Tremblay et al., "An Introduction to Data Structures with Applications," 2nd ed., McGraw–Hill, pp. 811–826, 1984.*
Willard, "Multidimensional Search Trees that Provide New Types of Memory Reductions," Journal of the Association for Computing Machinery, vol. 34, No. 4, pp. 846–858, 1987.*
Bell et al., "The Evolution of the DEC System 10," *Communications of the ACM*, v. 21, No. 1, Jan. 1978, pp. 44–63.
Bentley et al., "Data Structures for Range Searching," *Computing Surveys*, vol. 11, No. 4, Dec. 1979, pp. 397–409.
Bentley, Multidimensional Binary Search Trees Used for Associative Searching, vol. 18, No. 9, Sep. 1975, pp. 509–517.
Date, "An Introduction to Database Systems," Addison–Wesley Publishing Company, 1981, pp. 1–60, 97–114, 159–180, 237–274, 279–337, and 387.
Korth et al., "Database Systems Concepts," Mc–Graw–Hill Book Company, 19.
Lum, "Multi–attribute Retrieval with Combined Indexes," *Communications of the ACM*, vol. 13, No. 11, Nov. 1970.
Naylor, et al., editors, "Computer Based Planning Systems," Planning Executive Institutes, 1982.
Nievergelt et al., "The Grid File: An Adaptable, Symmetric Multikey File Structure," *ACM Transactions on Database Systems*, vol. 9, No. 1, Mar. 1984, pp. 38–71.
Schkolnick, "The Optimal Selection of Secondary Indices for Files," *Information Systems*, vol. 1, Pergamon Press, 1975 pp. 141–146.
Teorey et al., design of Database Structures, Prentice–Hall, Inc., 1982.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–19 is confirmed.

\* \* \* \* \*